(12) United States Patent  (10) Patent No.: US 7,318,334 B2
Carter  (45) Date of Patent: Jan. 15, 2008

(54) POWERED PIPE FLARING TOOL

(76) Inventor: Sam W. Carter, 4170 Indian Hills Trail, West Branch, MI (US) 48661

( * ) Notice: Subject to any disclaimer, the term of this patent is extended or adjusted under 35 U.S.C. 154(b) by 63 days.

(21) Appl. No.: 11/144,323

(22) Filed: Jun. 3, 2005

(65) Prior Publication Data

US 2005/0229668 A1  Oct. 20, 2005

(51) Int. Cl.
B21D 41/02 (2006.01)

(52) U.S. Cl. .................. 72/317; 72/318; 72/430

(58) Field of Classification Search ............. 72/317, 72/318, 370.11, 116, 117, 125, 430
See application file for complete search history.

(56) References Cited

U.S. PATENT DOCUMENTS

| 2,064,129 | A | * | 12/1936 | Temple, Jr. ............. 29/517 |
| 2,132,148 | A | * | 10/1938 | Davis ................... 72/430 |
| 2,320,680 | A | * | 6/1943 | Temple ................. 72/396 |
| 2,968,043 | A | * | 1/1961 | Demler ................. 72/430 |
| 2,993,522 | A | * | 7/1961 | Temple et al. .......... 72/312 |
| 3,024,531 | A | * | 3/1962 | Haskell et al. ......... 30/272.1 |
| 3,031,007 | A | * | 4/1962 | Temple et al. .......... 72/318 |
| 3,163,200 | A | * | 12/1964 | Broske et al. .......... 72/412 |
| 3,175,289 | A | * | 3/1965 | Wilterdink et al. ...... 30/180 |
| 3,192,758 | A | * | 7/1965 | Catlin et al. .......... 72/316 |
| 3,194,040 | A | * | 7/1965 | Rasmussen ............. 72/56 |
| 3,218,057 | A | * | 11/1965 | Catlin ................. 269/165 |
| 3,662,452 | A | * | 5/1972 | Stonestrom ............ 29/282 |
| 3,763,738 | A | * | 10/1973 | Temple ................ 89/1.14 |
| 3,827,278 | A | * | 8/1974 | Mershon et al. ........ 72/430 |
| 3,931,726 | A | * | 1/1976 | Grubb ................. 72/430 |
| 4,399,829 | A | | 8/1983 | Schuler |
| 5,233,749 | A | | 8/1993 | Saito et al. |
| 5,657,676 | A | | 8/1997 | Coller |
| 6,626,081 | B2 | | 9/2003 | Ho et al. |

* cited by examiner

Primary Examiner—Daniel C Crane
(74) Attorney, Agent, or Firm—Robert L. Farris; Farris Law, P.C.

(57) ABSTRACT

The powered pipe cutter and the pipe flaring tool both have a piston slidably mounted in a cylinder. The cylinder has a top end closed by a top end plug. A crimped cartridge bore in the top end plug communicates with a gas expansion chamber. A bolt and firing pin assembly are attached to the cylinder top end. The pipe cutter includes a shear housing with a pipe passage connected to the rod end of the cylinder. A shear plate is connected to the piston and moves with the piston to shear pipes. The pipe flaring tool includes a pipe clamp assembly with a pipe passage and a female flaring surface connected to the cylinder rod end. A male flaring surface on the piston cooperates with the female flaring surface to flare pipe ends.

7 Claims, 8 Drawing Sheets

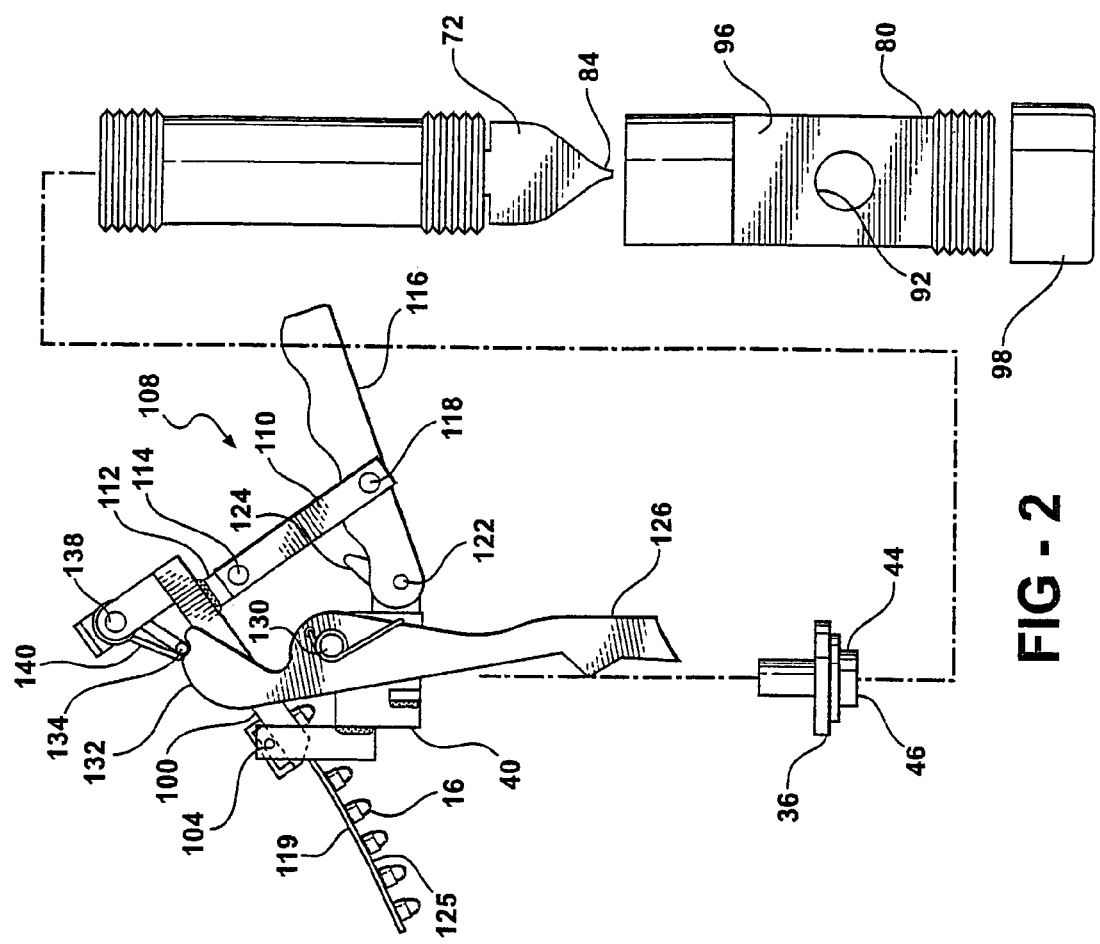
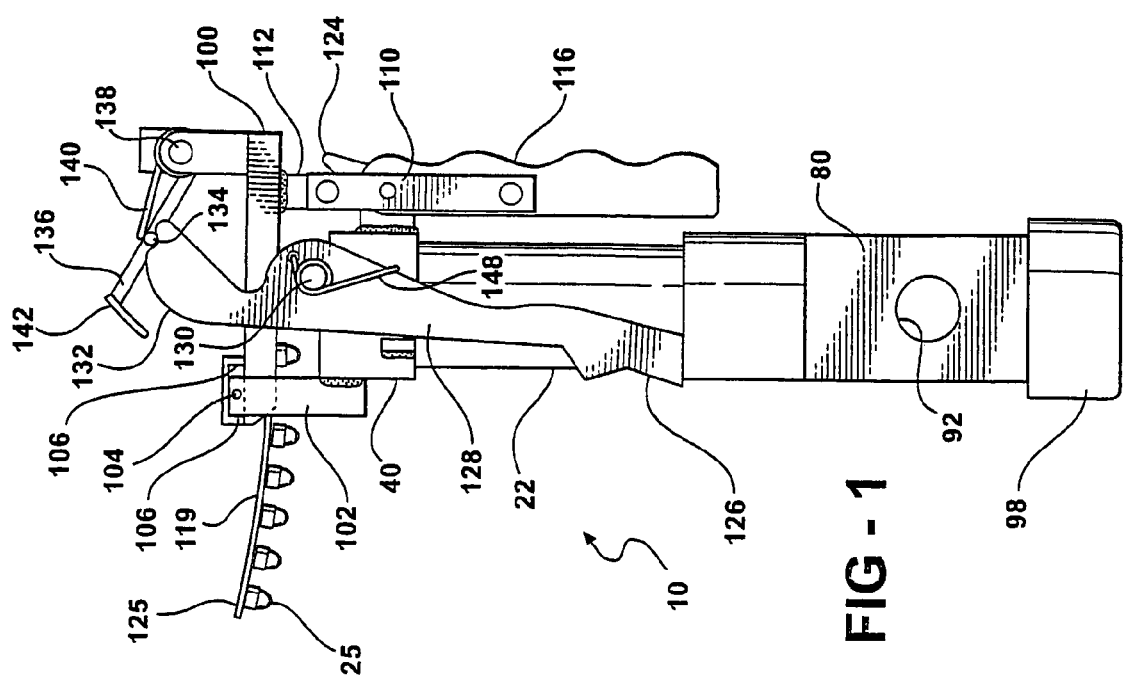

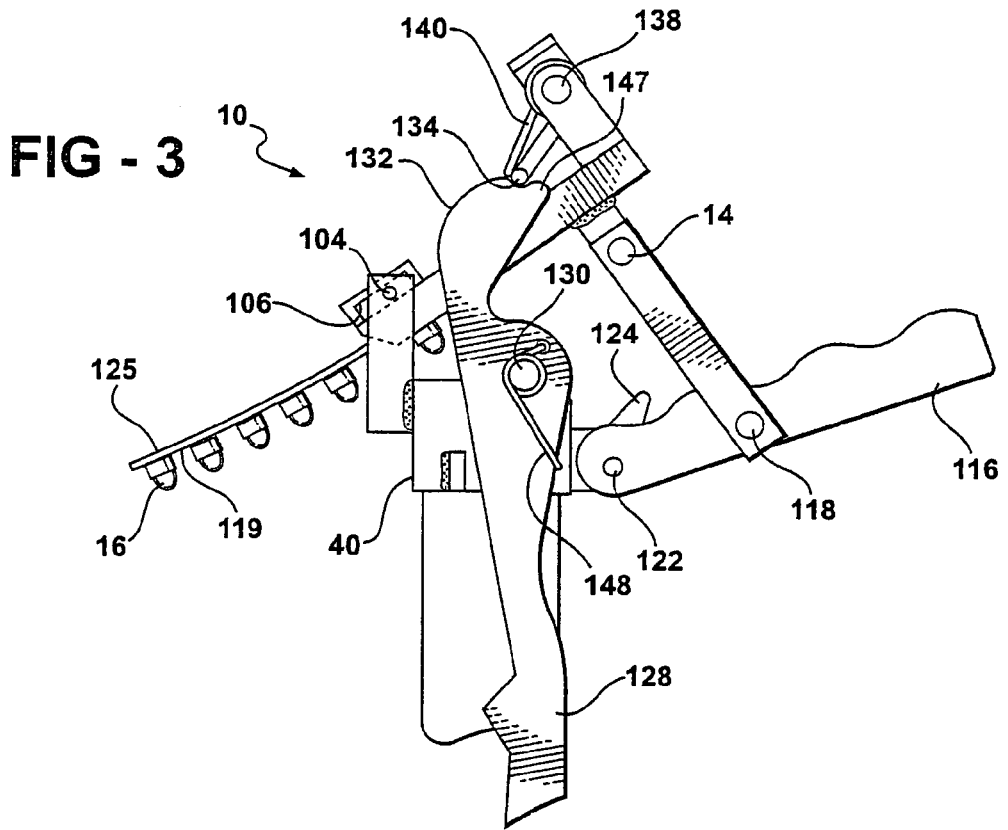
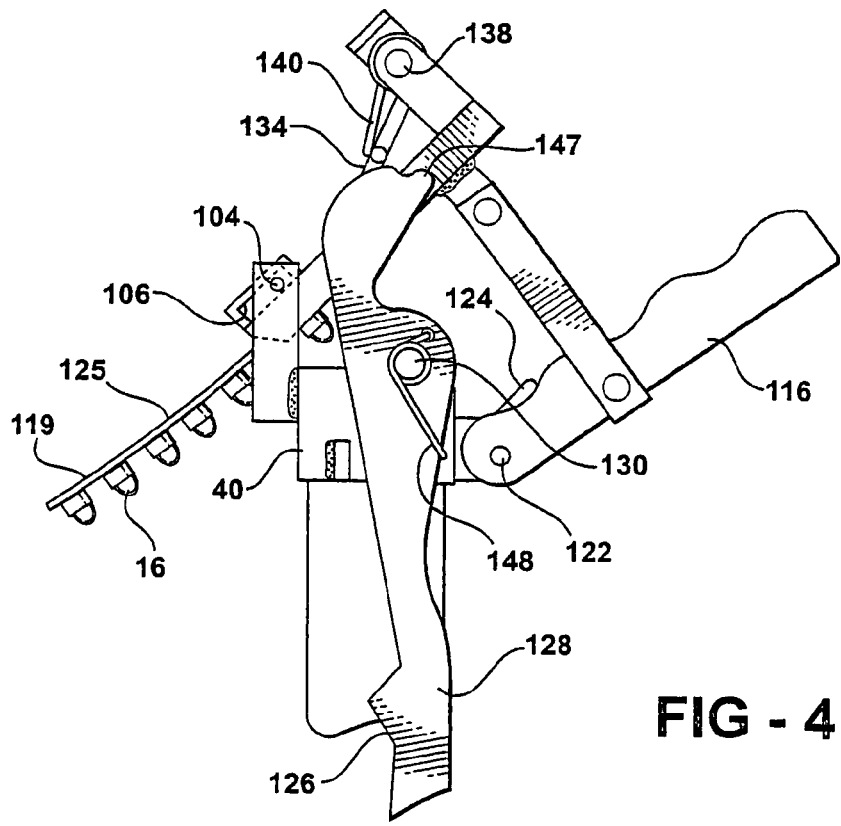

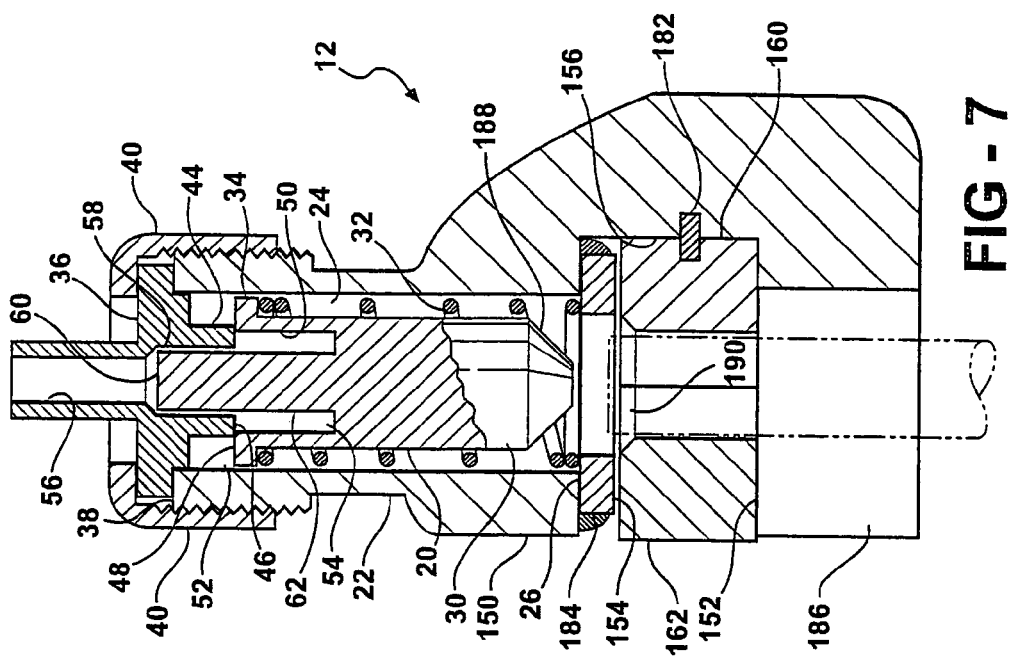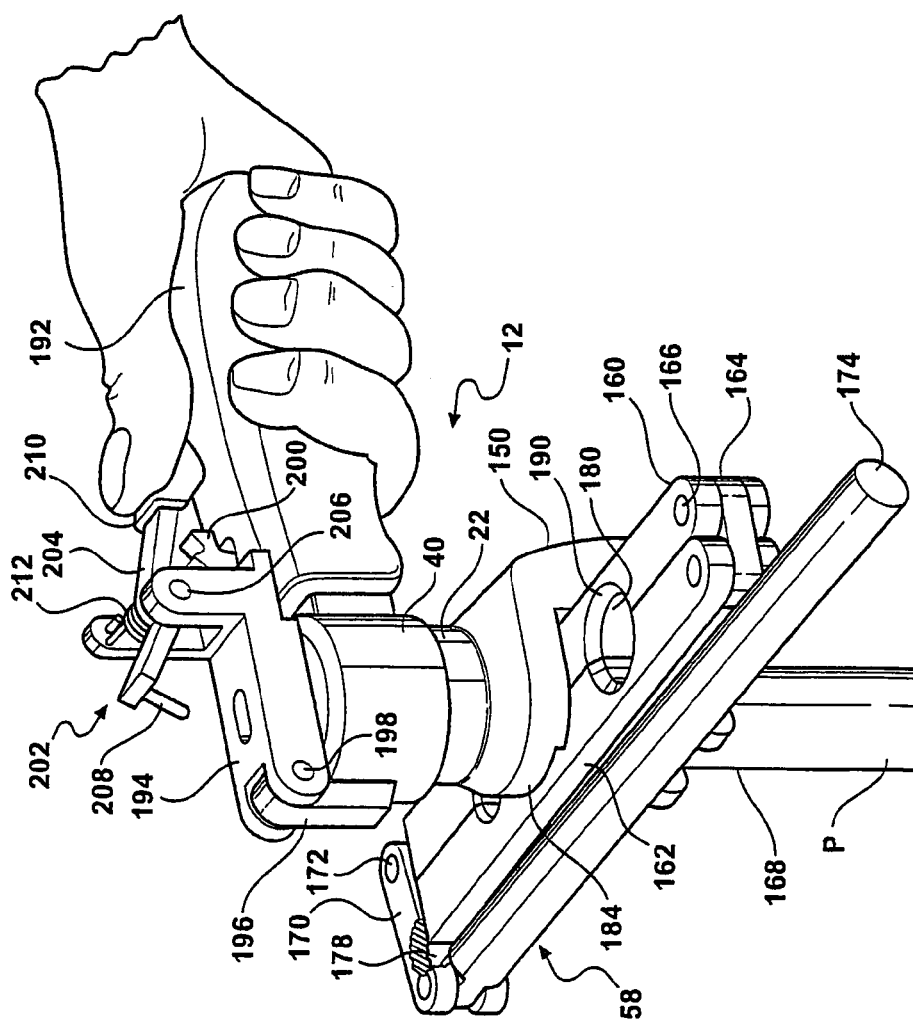

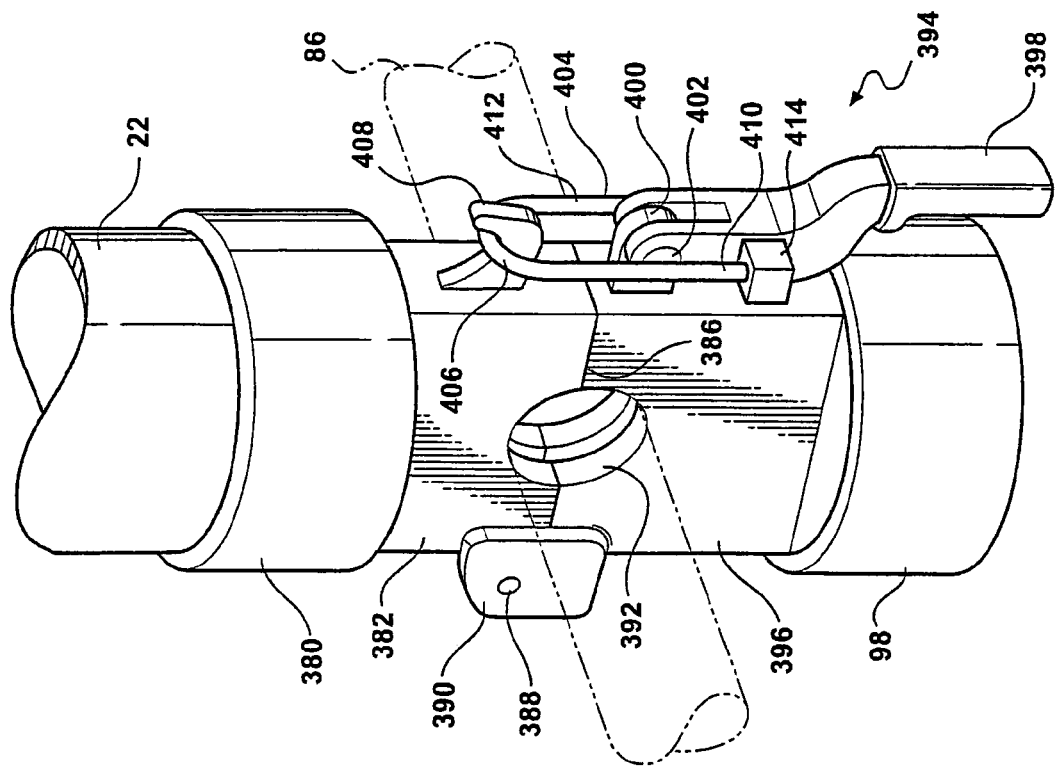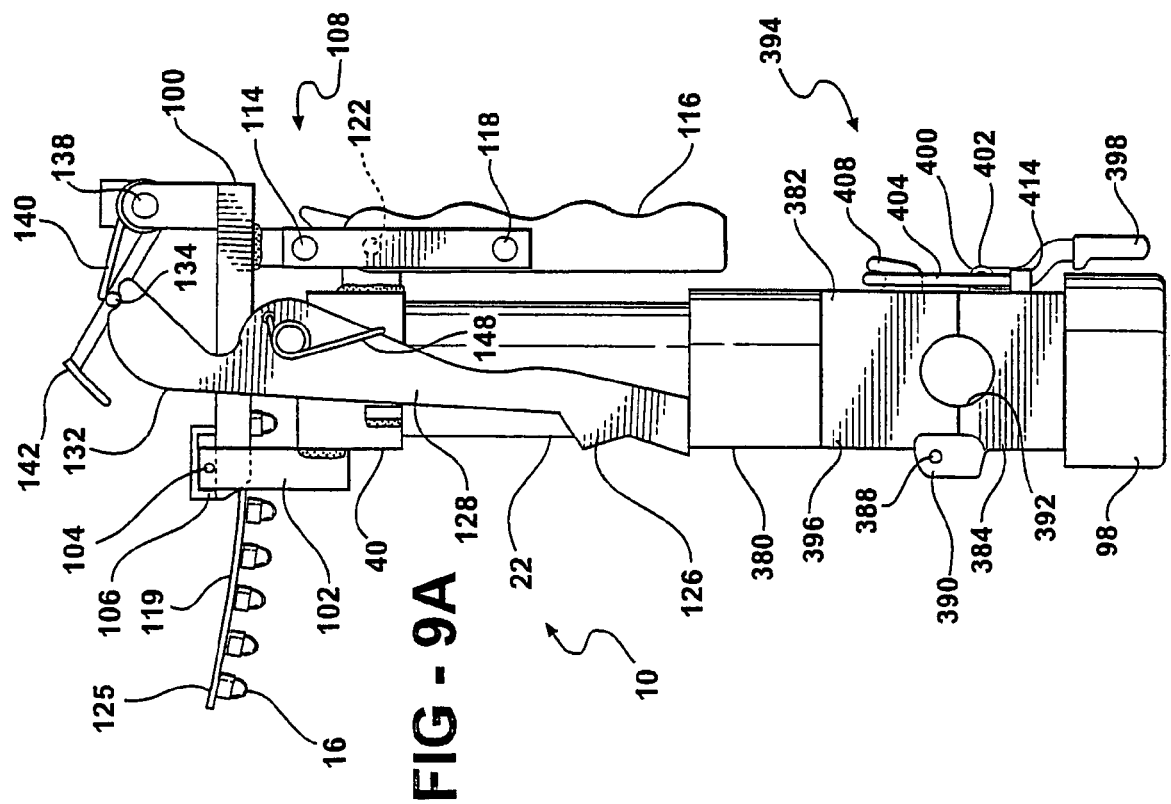

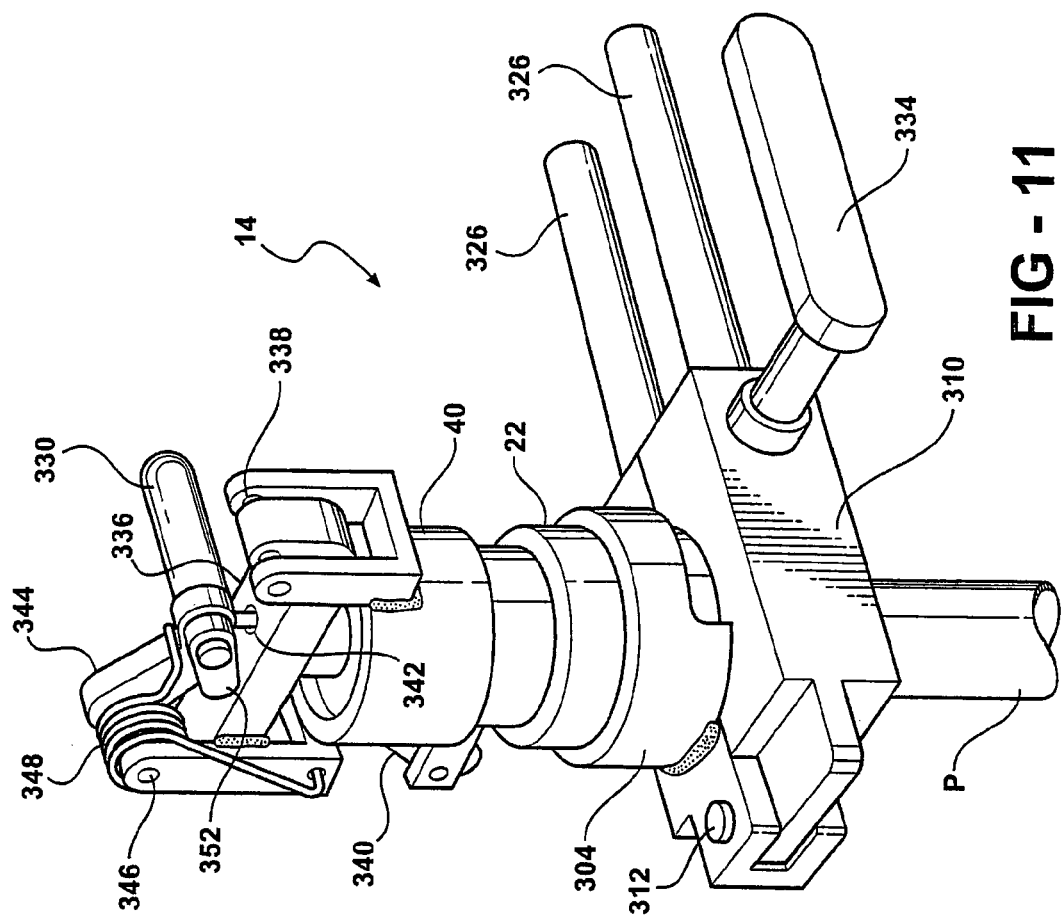
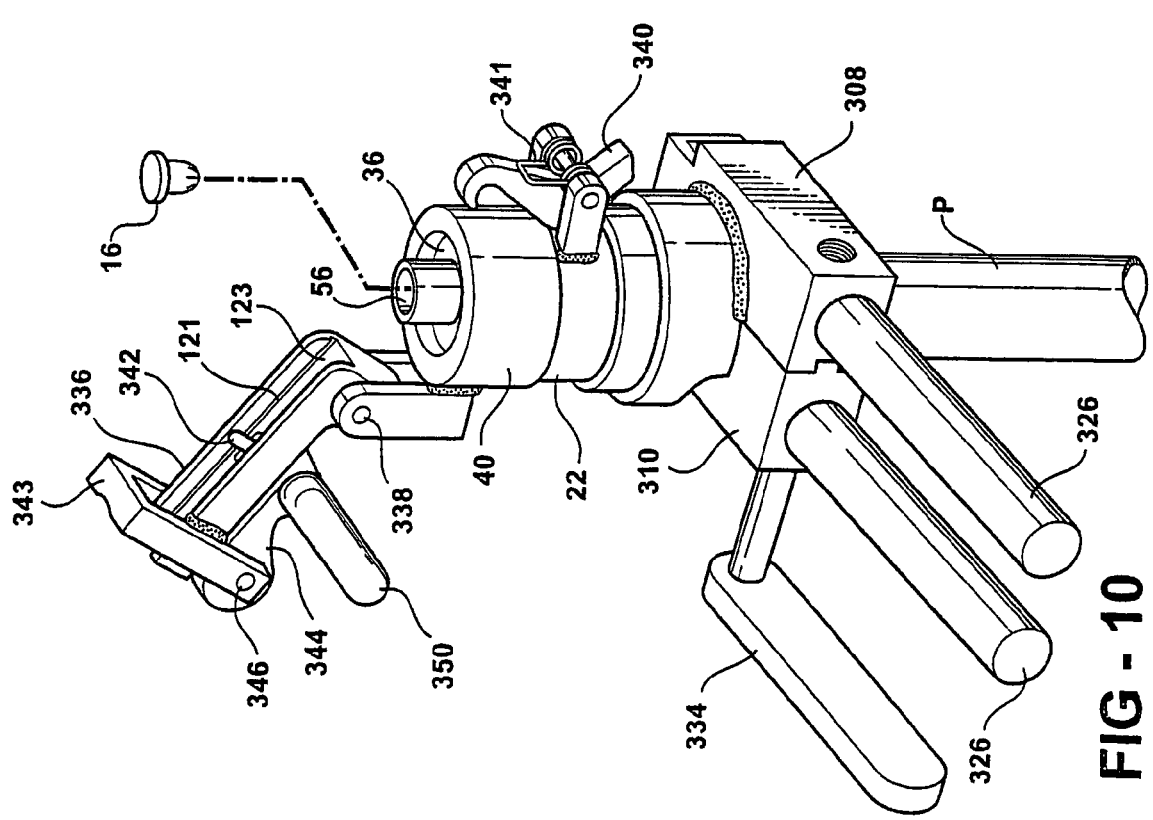

US 7,318,334 B2

POWERED PIPE FLARING TOOL

CROSS REFERENCE TO RELATED APPLICATIONS

This application claims the benefit of the filing date of U.S. Provisional Application No. 60/291,405, titled "POWERED PIPE CUTTER AND FLARING TOOL", filed May 16, 2001, and U.S. patent application Ser. No. 10/147,570, titled "POWERED PIPE CUTTER AND FLARING TOOL", filed May 16, 2002, now U.S. Pat. No. 6,994,009.

TECHNICAL FIELD OF THE INVENTION

The powered pipe cutter and flaring tool are powered by gas from crimped cartridges, cut pipes to length and flare the cut ends of pipes to form one part of flared pipe connections.

BACKGROUND OF THE INVENTION

Pipes made from metals such as soft copper, rigid copper and steel are used to carry many different liquids and gases. Various tools are employed to cut these pipes to the desired length. These tools include lathes, grinders, shears, power saws, hand saws and pipe cutters with a rolling disk cutter and rollers. A variety of connector systems are used to connect pipes together. These connector systems include threaded couplers that attach to threaded pipes, welded joints, soldered connections, compression connections, and flared connections.

Flared connections are commonly used today for a range of uses. They are relatively inexpensive, can be subjected to reasonably high temperatures and pressures, resist leakage of both liquids and gases, and are generally reliable.

A range of tools are available for cutting metal pipes to length as well as flaring the ends of pipes for flared connections. Some of these tools are large, expensive and non-transportable. Many of the tools require electricity. The tools that are transportable and manually operable are generally relatively slow, require substantial physical effort to operate, and frequently fail to produce acceptable results.

Pipe cutters with a rotatable cutter disk and rollers that engage a pipe to be cut tend to reduce the inside diameter of the pipe and can change the shape of a pipe if the tool user rushes the work too much.

Hand operated pipe flaring tools have a clamp member that engages the outside surface of a pipe to be flared. Occasionally these clamp members are not in the correct position relative to the pipe end. The flaring tool engages the clamp member and has a screw that is manually rotated to advance a conical flaring surface toward the pipe end. These flaring tools require substantial strength on the part of the user. An experienced user usually obtains an acceptable flare on copper pipe. It is much more difficult to obtain an adequate flare on steel lines. Steel lines are used for a variety of uses including hydraulic systems for mobile and stationary machines. The failure of a hydraulic line on these machines may require that the machine be shut down until the line is repaired. A reliable system for making a replacement line or repairing the old line, where the machine is located, is needed.

SUMMARY OF THE INVENTION

A pipe flaring tool includes a cylinder with a top end and a rod end. A piston is slidably mounted in the cylinder. A top end plug with a crimped cartridge bore is on the top end of the cylinder. A bolt and firing pin assembly are attached to the cylinder top end. A gas expansion chamber is formed in the cylinder between the head end plug and the piston. The gas expansion chamber is connected to the crimped cartridge bore. A male flaring surface is carried by a rod end of the piston and is movable with the piston. A pipe clamp assembly has a pipe passage surrounded by a female flaring surface. The female flaring surface is in axial alignment with the male flaring surface. The female flaring surface is also axially fixed relative to the cylinder.

BRIEF DESCRIPTION OF DRAWINGS

The presently preferred embodiment of the invention is disclosed in the following description and in the accompanying drawings, wherein:

FIG. 1 is a side elevational view of the pipe cutter ready to cut a pipe;

FIG. 2 is an expanded elevation view of the pipe cutter;

FIG. 3 is a side elevational view of the pipe cutter with a bolt partially closed and parts broken away;

FIG. 4 is a side elevation view of the pipe cutter with the bolt fully open and parts broken away;

FIG. 6 is a perspective view of the small tube diameter flaring tool;

FIG. 7 is a sectional view of the small tube diameter flaring tool with the bolt broken away;

FIG. 9A is a side elevational view of the pipe cutter with an openable pipe shear housing;

FIG. 9B is an enlarged perspective view of the pipe cutter with the openable pipe shear housing closed and parts broken away;

FIG. 10 is a perspective view of the large pipe diameter flaring tool with the bolt open;

FIG. 11 is a perspective view of the large pipe diameter flaring tool with the bolt closed.

DETAILED DESCRIPTION OF THE PREFERRED EMBODIMENTS

Figure 5:
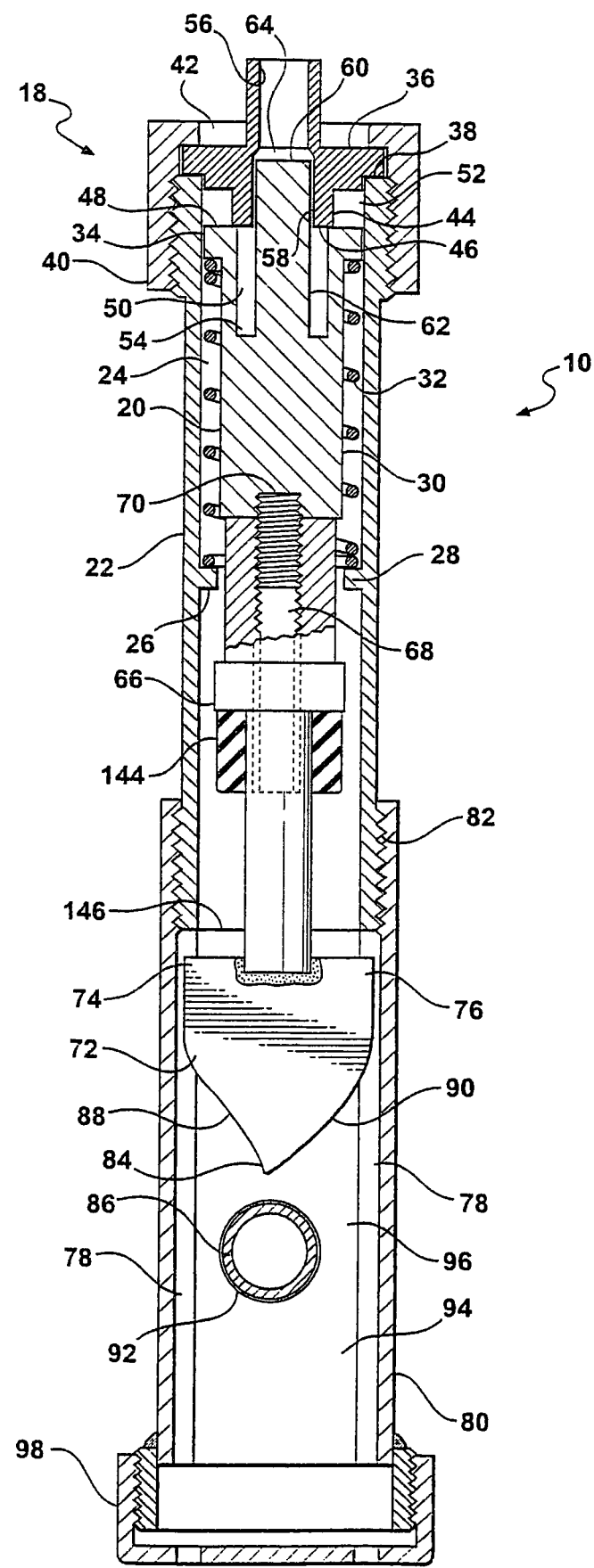
FIG. 5 is a sectional view of the pipe cutter with the bolt removed.
Figure 8:
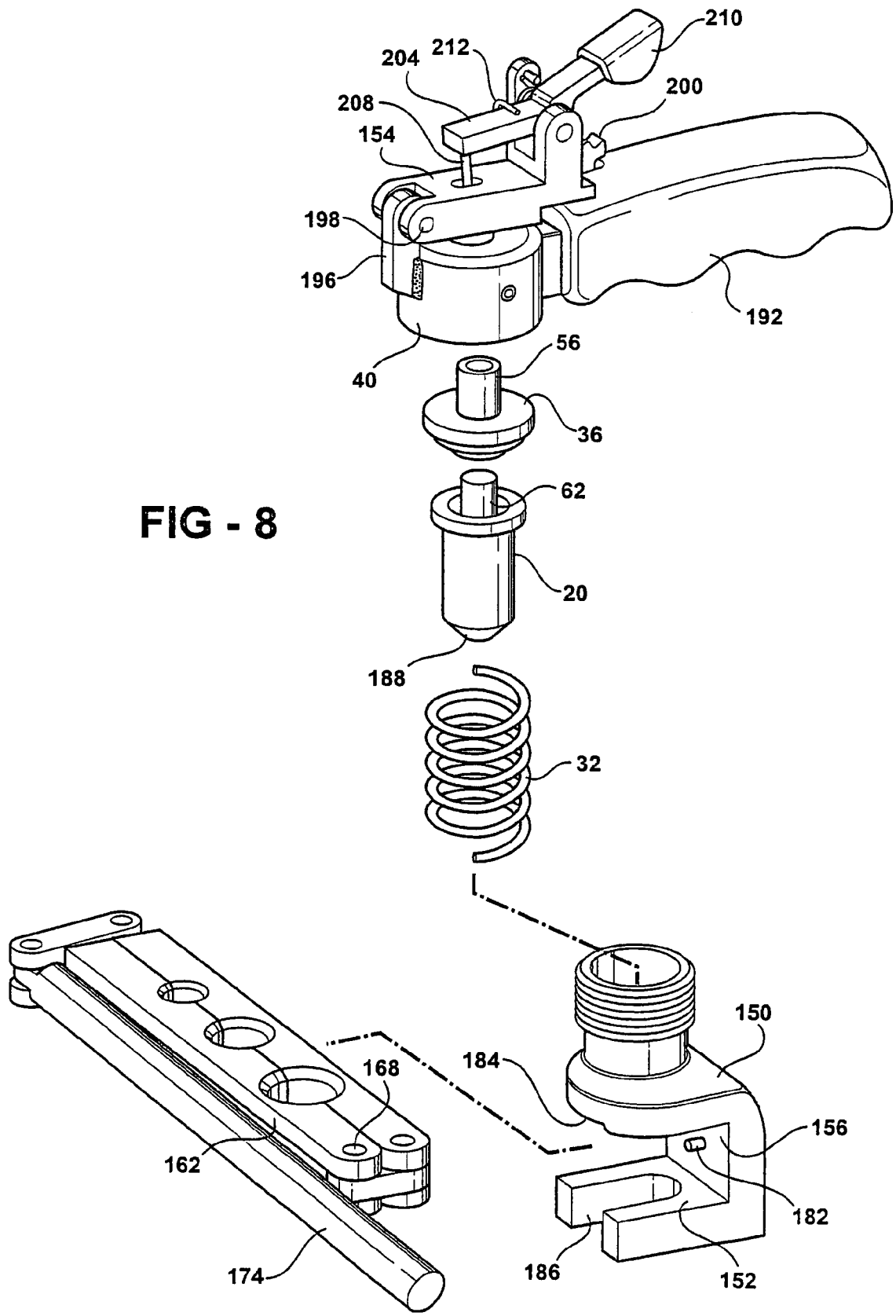
FIG. 8 is an expanded perspective view of the small tube diameter flaring tools.
Figure 12:
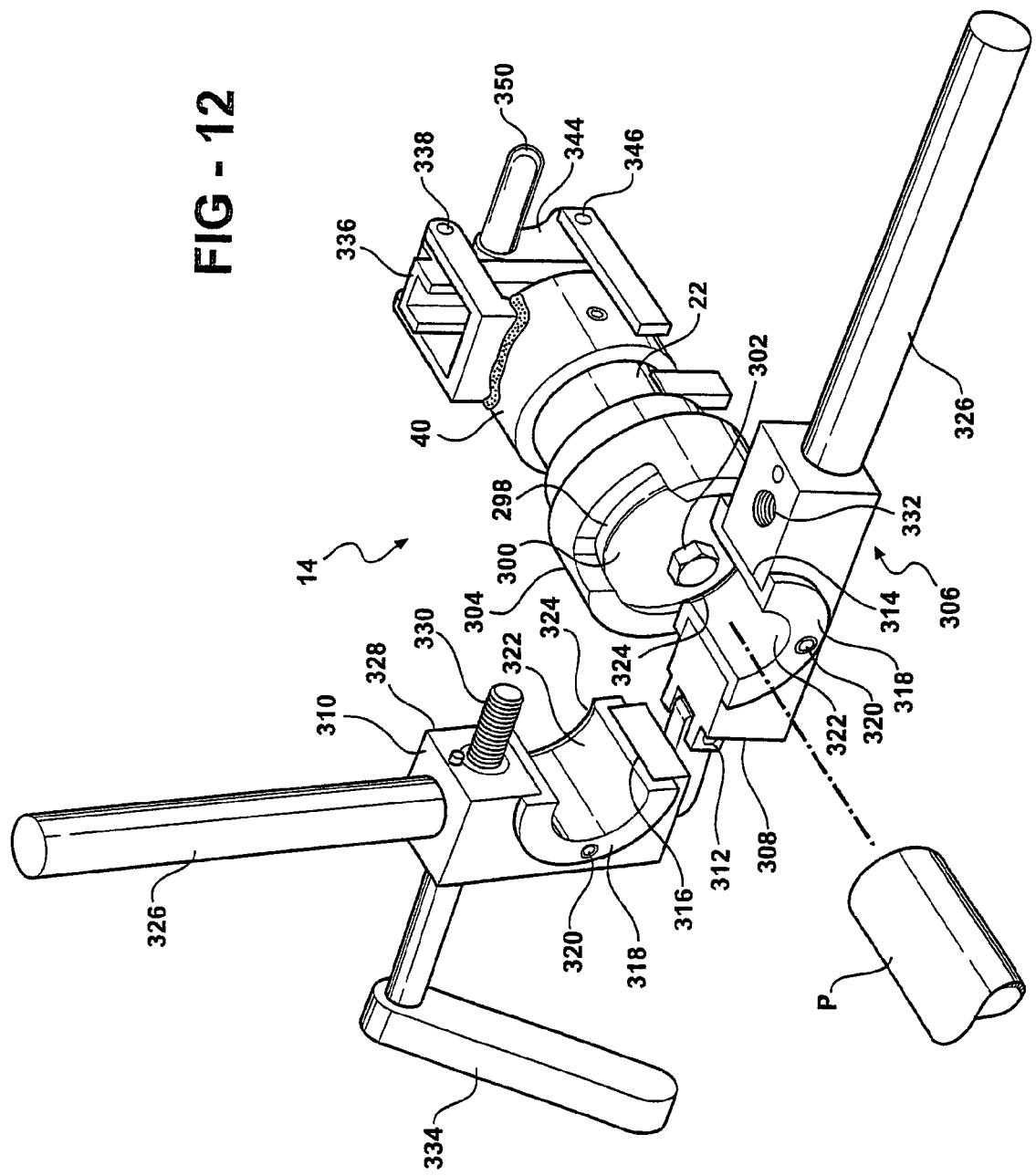
FIG. 12 is a perspective view of the large pipe diameter flaring tool with the pipe clamp open.

A pipe cutter 10 is shown in FIGS. 1-5. A small pipe diameter flaring tool 12 is shown in FIGS. 6-8. A large pipe diameter flaring tool 14 is shown in FIGS. 10-12. All of these tools are powered by a crimped cartridge 16. The gas expansion chambers 18 and pistons 20 in all three tools are substantially the same. The piston 20 and gas expansion chambers 18 are shown in FIGS. 5 and 7 and will be described first.

The piston 20 is mounted in a cylinder 22. The cylinder has a smooth cylindrical bore 24. A spring abutment flange 26 extends radially inward from the bore 24. A cylindrical passage 28 through the spring abutment flange 26 is larger than the diameter of the main body 30 of the piston 20. A compression spring 32 sets on the spring abutment flange 26 and extends upwardly. A cylindrical flange 34 on the upper end of the piston 20 sits on the upper end of the compression spring 32. The diameter of the cylindrical flange 34 is slightly less than the inside diameter of the cylindrical bore 24.

A cylinder plug 36 is clamped to the top of the cylinder 22 and closes the top end 38 of the cylinder. A cap 40 with a central opening 42 screws onto the cylinder 22 and clamps the cylinder plug 36 in place. A cylindrical inner portion 44 of the cylinder plug 36 has a bottom surface 46 that abuts an upper end 48 of the piston 20, forces the piston into the bore 24 and compresses the compression spring 32. The cylindrical inner portion 44 of the plug 36 is a few thousandths of an inch larger in diameter than the bore 50 in the upper end of the piston 20 and separates an inner chamber 54 from the cylinder head end chamber 52. An upper axial bore 56 in the plug 36 forms a cartridge chamber. A lower axial bore 58 in the plug 36, is larger in diameter than the upper bore 56, and forms an extension of the inner chamber 54. A valve seat 60 is formed at the junction of the upper axial bore 56 and the lower axial bore 58 in the plug 36. A pin 62 on the piston 20 extends upwardly through the bore 50 and the bore 58 to the valve seat 60. The pin 62 is smaller in diameter than the lower axial bore 58 to permit free passage of gases into the inner chamber 54 when the pin 62 is out of contact with the valve seat 60. The pin 62 can contact the valve seat 60 at the same time the bottom surface 46 of the cylindrical plug 36 contacts the upper end 48 of the piston 20 to seal the inner chamber 54. There can be up to 0.050 inch clearance between the pin 62 and the valve seat 60 and the piston can perform useful work. A clearance of up to 0.050 of an inch can be between the bottom surface 46 and the upper end 48 of the piston 20 rather than at the valve seat 60 and the piston can perform useful work. If the clearance in either location exceeds 0.050 of an inch, the piston 20 will not provide the desired force. The pin 62 can be adjusted axially or the valve seat 60 could be axially adjustable to provide the desired clearance. Adjusting the clearance between 0 clearance and 0.050 of an inch clearance adjusts the force exerted by the piston 20. It has also been observed that the noise generated by the crimped cartridge 16 is substantially muffled when the piston exerts maximum force. When the clearance past the valve seat 60 exceeds 0.050 inches the crimped cartridge 16 generates substantial noise.

A crimped cartridge 16 inserted into the upper axial bore 56 seals a primary chamber 64 between the crimped cartridge 16 and the valve seat 60. Gases passing the valve seat 60 enter the large inner chamber 54 and continue to expand. Downward movement of the piston 20 moves the upper end 48 of the piston 20 away from the bottom surface 46 and allows gases to enter the head end chamber 52. This movement of gas between three chambers ensures that substantially all of the propellant in the crimped cartridge is fully burned and adequate force is exerted on the piston 20.

The pipe cutter 10 has a piston extension 66 connected to the piston 20 by a bolt 68 that screws into the extension and into a threaded bore 70 in the piston. A flat hardened steel shear plate 72 is welded to the bolt 68. The wings 74 and 76 of the shear plate 72 are guided by four guide plates 78 and a shear housing 80 that is attached to the cylinder 22 by threads 82. The shear plate 72 has a lance portion 84 that is off set to one side of a pipe 86 that is to be cut. Shear surfaces 88 and 90 extend from the lance portion 84 to the wings 74 and 76. The profile of the shear surface 88 is different from the profile of the shear surface 90 to obtain a better cut. The pipe 86 passes through bores 92 through the shear housing 80. These bores 92 pass through plates 96 that are separated apart by the thickness of the shear plate 72. A relief 94 in the plates 96 allows metal sheared from a pipe to fall freely into a retainer cup 98 that screws onto the bottom of the shear housing 80. The lance portion 84 of the shear plate 72 is off set from the center of the pipe 86 so that it shears the pipe rather than partially collapsing a wall of the pipe.

The bolt 100 is pivotally attached to parallel post 102 by a pin 104. The posts 102 are welded to the cap 40. The pin 104 passes through a slot 106 through the bolt 100. The bolt is held in a closed position by an over center linkage 108. The linkage includes two parallel links 110 that are pivotally attached to an ear 112 by a pin 114. A handle 116 is pivotally attached to the parallel links 110 by pin 118 and to an ear 120 by pin 122. The ear 120 is welded to the cap 40. A cam surface 124 on the ear 120 urges the bolt 100 to the left, as shown in FIGS. 1 and 2, after the crimped cartridge 16 has entered the cartridge chamber 56 and the plastic cartridge holder is held in place relative to the cylinder plug 36.

Pivoting the trigger end 126 of the bell crank 128 counterclockwise about the axis of the pin 130, as shown in FIGS. 1 and 2, moves the sear end 132 from under the pin 134. This frees the firing pin assembly 136 to pivot counterclockwise about the pin 138 under the force of the coil spring 140. The striker 142 strikes a primer on the crimped cartridge 16 and the shear plate 72 is advanced and shears the pipe 86 into two pieces. The tubing 144 on the bolt 68, shown in FIG. 5, contacts the top edges 146 of the plates 96 and stops downward movement of the piston 20 and the shear plate 72. The tubing 144 is a neoprene spring with a selected spring rate. The spring 32 forces the piston 20 back to the position shown in FIGS. 1 and 5. The handle 116 is then pivoted to the position shown in FIG. 4 lifting the pin 134 up over the sear 132. This lifts the spent crimped cartridge 16 out of the cartridge chamber 56. The handle 116 is then pivoted clockwise about the pin 122 as shown in FIG. 3 moving the pin 134 into contact with the finger 147 on the sear 132. Continued clockwise movement of the handle 116 moves the bolt 100 to the left until the pin 104 contacts the left end of the slot 106 and a new crimped cartridge 116 enter the cartridge chamber 56. The bell crank 128 is rotated clockwise about the pin 130 and the torsion spring 148 is tensioned. As the bolt 100 closes the new cartridge 16 is held in the cartridge chamber 56, the cam surface 124 moves the bolt 100 to the left and the handle 116 moves into a locked position as shown in FIG. 1.

The crimped cartridges 16 can be loaded into the upper bore 56, which forms a cartridge chamber, manually or automatically as shown in FIGS. 1, 2, 3, 4, and 9A. The crimped cartridges 16 can be purchased in a plastic strip 125 with two parallel side edges 119. The side edges of the plastic strip 125 are received in grooves in the sides of a channel in the bolt 100 like the grooves 121 in the channel 123 of bolt 336 shown in FIG. 10. When the handle 116 is moved, from the bolt 100 in the fully open position shown in FIG. 4 toward the closed position shown in FIG. 1, the bolt moves to the right until the pin 104 contacts the left end of the slot 106. This advances the plastic strip 125 to the right together with the bolt 100. After the next crimped cartridge 16 in the plastic strip 125 is at least partially inserted into the cartridge chamber 56, the pin 114 contacts the cam surface 124, moves the bolt 100 to the left, and advances the plastic strip to the right relative to the bolt. The bolt 100 is then in the position shown in FIG. 1 and ready to sever a pipe. After the crimped cartridge 16 in the chamber 56 has been expended, the handle 116 is moved counterclockwise about the pin 122 to open the bolt 100 as explained above. The counterclockwise movement of the handle 116 as shown in FIG. 1 first slides the bolt 100 to the left until the pin 104 contacts the right end of the slot 106 and then lifts the spent crimped cartridge from the chamber 56. This movement of the bolt 100 relative to the pin 104 advances the plastic strip 125 to the right relative to the bolt. As described above, advancing the plastic strip 125 relative to the bolt 100 to move a new crimped cartridge 16 into the chamber 56 takes place in two relatively small steps. It would however be possible to advance a new cartridge in one large step if desired.

The pipe cutter 10 as shown in FIGS. 1 through 5 has a shear housing 80 with bores 92 for the passage of a pipe 86 that is to be cut. The bores 92 through the plates 96 are for a pipe 86 with a specific diameter. To cut a pipe 86 with a different diameter, the shear housing 80 is unscrewed from the threads 82 on the cylinder 22 and replaced by a shear housing 80 with pipe bores 92 that have a diameter that corresponds to the diameter of the pipe to be cut. The pipe bores 92 receive a pipe 86 telescopically only. In some circumstances it is not possible to telescopically slide the shear housing 80 on a pipe 86 to a position in which the pipe is to be cut.

FIGS. 9A and 9B show a pipe cutter 10 with a modified shear housing 380. The modified shear housing 380 screws onto the cylinder 22 like the shear housing 80. The plates 396 are severed to form an upper portion 382 and a lower portion 384, along a line 386. The line 386 passes through the axis of the pipe bore 392. The lower portion 384 is pivotally attached to the upper portion 382 by a hinge with a pivot shaft 388. The pivot shaft 388 is attached to the upper portion 382 and passes through two ears 390. The ears 390 are welded to the lower portion 384. A lock assembly 394 locks the lower portion 384 to the upper portion 384 after a pipe 86 which is to be cut is positioned in the pipe bore 392. The lock assembly 394 includes a locking lever 398 that is pivotally attached to a tab 400 by a pivot pin 402. A U-shaped link 404 has a base 406 that engages a hook 408. The hook 408 is fixed to the upper portion 382. The free ends 410 and 412 of the U-shaped link 404 are connected to blocks 414. The blocks 414 are pivotally attached to the locking lever 398 for pivotal movement about an axis that is parallel to the axis of the pivot pin 402 and the pivot shaft 388. Force exerted on the locking lever 398 by the U-shaped link 404, when the locking lever 398 is in a locked position, urges the U-shaped link toward the locked position. A retainer cup 98 screws to the free end of the lower portion 384 to catch material cut from a pipe 86 during severing.

The cylinder 22 of the small pipe diameter flaring tool 12 is integral with a c-shaped pipe clamp holder 150. The pipe clamp holder 150 has a pipe clamp passage with a bottom wall 152, a top wall 154 and a back wall 156. A pipe clamp assembly 158 has two clamp bars 160 and 162 that are pivotally connected to each other by a link bar 164 and pivot pins 166 and 168. A two bar yoke 170 is pivotally attached to an end of the clamp bar 160, opposite the link bar 164, by a pivot pin 172. A lever 174 is pivotally attached to the yoke 170 by a pivot pin 176. A cam 178 on the lever 174 engages the clamp bar 162 and forces both clamp bars together. A pipe P is inserted into the cooperating half apertures 180 with the appropriate diameter and clamped in place by the lever 174. The clamp assembly 158 and the pipe P is then inserted into the pipe clamp passage with the bar 160 engaged in the wall 156 and an alignment pin 182 anchored in the clamp holder 150, received in an alignment passage in the clamp bar 160. An end of the pipe P extends out of the clamp assembly 158 as shown in FIG. 7. A passage 184 provides space for the pipe end to move into the pipe holder 150. The passage 184 is also a gauge to indicate if the end of the pipe P extends the correct distance from the aperture 180. A passage 186 through the bottom wall 152 accommodates the long portion of the pipe P. Conical surfaces 188 on the piston 20 cooperate with conical surfaces 190 at the other end of the cooperating half apertures 180 to form a flared pipe end.

A handle 192 is welded to the cap 40. A bolt 194 is pivotally attached to a bar 196 welded to the cap 40, by a pin 198. Individual crimped cartridges 16 are inserted into the cartridge chamber 56 with this flaring tool 12. A relatively small charge is required to flare small diameter pipes. With small charges, the plastic cartridge holder 125 is not required to extract spent cartridges 16 from the cartridge chamber 56. A latch 200 holds the bolt 194 in a closed position.

A firing pin assembly 202 includes a bell crank 204 that is pivotally attached to the bolt 194 by a pivot pin 206. A striker or firing pin 208 is provided on one end of the bell crank 204. A thumb pad 210 is provided on the other end of the bell crank 204. A torsion spring 212 urges the bell crank 204 in a counterclockwise direction as shown in FIG. 6. To flare a pipe P held in alignment with the piston 20, the thumb pad 210 is pressed downward and then released. The spring 212 drives the firing pin 208 into a primer in the crimped cartridge 16.

The large diameter pipe flaring tool 14 has a male flaring block 298 with a conical flaring surface 300 clamped to the piston 20 by a bolt 302. The flaring block 298, which is larger than the cylinder 22, is housed in a bell housing 304 attached to a lower end of the cylinder 22. The pipe clamp assembly 306 has a first flaring block 308 attached to the bell housing 304. A second flaring block 310 is pivotally attached to the first block by pivot pin 312. A recess 314 in the first block 308 cooperates with a recess 316 in the second block 310 to form a cylindrical bore that is coaxial with the cylinder 22. A flaring die half 318 is mounted in each recessed area 314 and 316. Mechanical fasteners 320 hold the die halves 318 in place. The die halves 318 have a cylindrical pipe clamping surface 322 and a conical flaring surface 324. The conical flaring surfaces 324 cooperate with the male conical flaring surface 300 to flare the end of a pipe P. Handles 326 for closing the die halves 318, are attached to the first and second flaring blocks 308 and 310. An alignment pin 328 ensures alignment of the two flaring blocks 308 and 310. After the die halves 318 are closed, the bolt 330 is screwed into the threaded bore 332 and tightened with the clamp handle 334 to clamp the pipe P in place.

The bolt 336 is pivotally attached to the cap 40 by a pivot pin 338 as shown in FIGS. 10 and 11. A latch 340, biased by a spring 341, engages a bar 343 and holds the bolt 336 in a closed position. The firing pin 342 is fixed to an arm 344. The arm 344 is pivotally attached to the bolt 336 by a pivot pin 346. A torsion spring 348 biases the firing pin 342 toward the cartridge chamber 56. A trigger lever 350 is fixed to the arm 344. A link 352 is pivotally attached to one end of the trigger lever 350. When the lever 352 extends downward parallel to the firing pin 342 the firing pin 342 is held in a cocked position. When the trigger lever 350 and the firing pin 342 are lifted manually and then released, centrifugal force pivots the link 352 to the position shown in FIG. 11 and the firing pin 342 strikes the crimped cartridge 16. The flaring block 298 is advanced toward the end of a pipe P by the piston 20 and expanding gas from the crimped cartridge 16. The end of the pipe is flared between the conical flaring surface 300 on the flaring block 298 and the conical flaring surfaces 324 on the flaring die halves 318. The flaring die halves 318 fit one size pipe P. Both die halves 318 are therefore changed when the pipe P to be flared has a different diameter.

The disclosed embodiment is representative of a presently preferred form of the invention, but is intended to be illustrative rather than definitive thereof. The invention is defined in the claims.

I claim:

1. A powered pipe flaring tool comprising:
    a cylinder with a cylinder bore, a cylinder top end and a cylinder bottom end;
    a piston slidably mounted in the cylinder;
    a compression spring mounted in the cylinder and urging the piston toward the cylinder top end;
    a top end plug mounted on the cylinder top end, a plug central bore passing through the top end plug and including a crimped cartridge bore portion that is coaxial with the cylinder bore;
    a conical male pipe flaring surface on a piston lower end;
    a gas primary expansion chamber in an upper axial bore of the plug central bore adjacent to the crimped cartridge bore portion, a gas inner expansion chamber inside the piston, and a gas head end expansion chamber in the cylinder and between the top end plug and a piston upper end;
    a valve seat inside the plug central bore in the top end plug that cooperates with a piston pin on the piston to control gas flow from the gas primary chamber and into the gas inner expansion chamber;
    a cylinder plug bottom surface that cooperates with a piston upper end to control gas flow from the gas inner expansion chamber and into the gas head end expansion chamber;
    a bolt and firing pin assembly attached to the cylinder top end;
    a pipe clamp assembly with a pipe passage surrounded by a female flaring surface that is axially fixed relative to the cylinder and wherein the female flaring surface is in axial alignment with the conical pipe male flaring surface; and
    wherein the piston pin moves away from the valve seat and the piston upper end simultaneously moves away from the cylinder plug bottom surface upon gas pressure in the gas primary expansion chamber moving the piston away from the cylinder top end.

2. A pipe flaring tool as set forth in claim 1 wherein the top end plug is clamped to the top end of the cylinder by a cap that screws onto the cylinder.

3. A pipe flaring tool, as set forth in claim 2, wherein the bolt and firing pin assembly are pivotally attached to the cap.

4. A pipe flaring tool, as set forth in claim 3, including a link pivotally attached to the firing pin assembly in a position to hold a firing pin out of contact with crimped cartridges in the crimped cartridge bore.

5. A pipe flaring tool, as set forth in claim 1 wherein the pipe clamp assembly includes a pipe clamp holder with a pipe clamp passage attached to the cylinder and a pipe clamp assembly with the female flaring surface mounted in the pipe clamp passage during pipe flaring operations.

6. A pipe flaring tool, as set forth in claim 1 wherein the pipe clamp assembly includes a first flaring block fixed to the cylinder, a second flaring block pivotally attached to the first flaring block, a flaring block clamp operable to clamp the second flaring block to the first flaring block, and the pipe passage is divided along a line of contact between the first flaring block and the second flaring block.

7. A pipe flaring tool, as set forth in claim 6 wherein the pipe passage includes a first flaring die half mounted on the first flaring block, a second flaring die half mounted on the second flaring block, the female flaring surface is on the first flaring die half and the second flaring die half, and wherein the first flaring die half and second flaring die half are changed to accommodate different pipe diameters.

* * * * *